United States Patent
Elchik et al.

(10) Patent No.: US 9,812,028 B1
(45) Date of Patent: Nov. 7, 2017

(54) AUTOMATED GENERATION AND PRESENTATION OF LESSONS VIA DIGITAL MEDIA CONTENT EXTRACTION

(71) Applicant: WeSpeke, Inc., Pittsburgh, PA (US)

(72) Inventors: Michael E. Elchik, Moon Township, PA (US); Dafyd Jones, Edgeworth, PA (US); Robert J. Pawlowski, Jr., Cranberry Township, PA (US); Jaime G. Carbonell, Pittsburgh, PA (US); Jeremy Hesidenz, McKees Rocks, PA (US); Sean Hile, Gibsonia, PA (US); Cathy Wilson, Glenview, IL (US)

(73) Assignee: WeSpeke, Inc., Pittsburgh, PA (US)

( * ) Notice: Subject to any disclaimer, the term of this patent is extended or adjusted under 35 U.S.C. 154(b) by 0 days.

(21) Appl. No.: 15/586,906

(22) Filed: May 4, 2017

Related U.S. Application Data

(60) Provisional application No. 62/331,490, filed on May 4, 2016, provisional application No. 62/428,260, filed on Nov. 30, 2016.

(51) Int. Cl.

| | |
|---|---|
| G06F 17/27 | (2006.01) |
| G09B 7/06 | (2006.01) |
| G10L 15/26 | (2006.01) |
| G06F 3/16 | (2006.01) |
| G09B 5/06 | (2006.01) |
| G09B 19/06 | (2006.01) |

(52) U.S. Cl.
CPC ............ *G09B 7/06* (2013.01); *G06F 3/167* (2013.01); *G06F 17/271* (2013.01); *G06F 17/274* (2013.01); *G06F 17/2765* (2013.01); *G06F 17/2785* (2013.01); *G09B 5/065* (2013.01); *G09B 19/06* (2013.01); *G10L 15/265* (2013.01)

(58) Field of Classification Search
CPC ....... G06F 17/30247; H04M 3/46; G09B 5/06
USPC ... 704/1–10, 250, 251, 255, 257, 270, 270.1
See application file for complete search history.

(56) References Cited

U.S. PATENT DOCUMENTS

| | | | |
|---|---|---|---|
| 8,761,574 | B2 | 6/2014 | Miller |
| 9,330,084 | B1 | 5/2016 | Kadambi et al. |
| 2002/0059072 | A1* | 5/2002 | Quibria ................. H04M 3/46 704/270 |
| 2004/0254983 | A1 | 12/2004 | Ando et al. |

(Continued)

FOREIGN PATENT DOCUMENTS

WO      2005050398 A2      6/2005

OTHER PUBLICATIONS

Agarwal, Manish et al., "Automatic Gap-fill Question Generation from Text Books", Proceedings of the Sixth Workshop on Innovative Use of NLP for Building Educational Applications, pp. 56-64, Jun. 24, 2011.

(Continued)

*Primary Examiner* — Huyen Vo
(74) *Attorney, Agent, or Firm* — Fox Rothschild LLP

(57) ABSTRACT

An automated lesson generation learning system extracts text-based content from a digital programming file. The system parses the extracted content to identify a sentence, and key words within the sentences, to use as prompts in the lesson. The system also automatically generates a clip from the digital programming file, so that the clip is the portion of the file in which the sentence is spoken. The system then automatically generates and outputs a lesson containing the prompt and the clip.

26 Claims, 8 Drawing Sheets

(56) References Cited

U.S. PATENT DOCUMENTS

| | | |
|---|---|---|
| 2005/0010952 A1 | 1/2005 | Gleissner et al. |
| 2006/0111902 A1* | 5/2006 | Julia ........................ G09B 5/06 |
| | | 704/236 |
| 2007/0112837 A1* | 5/2007 | Houh ................ G06F 17/30247 |
| 2008/0131851 A1 | 6/2008 | Kanevsky et al. |
| 2010/0316980 A1 | 12/2010 | Pazushko |
| 2013/0295534 A1 | 11/2013 | Meiri |
| 2013/0325897 A1 | 12/2013 | Motgi et al. |
| 2014/0272820 A1 | 9/2014 | Wride |
| 2014/0342320 A1 | 11/2014 | Nielson et al. |

OTHER PUBLICATIONS

Chali, Yllias, et al. "Towards Automatic Topical Question Generation", Proceedings of COLING 2012, pp. 475-492, Mumbai, Dec. 2012.

Heilman, Michael, et al., "Classroom Success of an Intelligent Tutoring System for Lexical Practice and Reading Comprehension", Language Technologies Institute, Carnegie Mellon University, Pittsbugh, Pennsylvania.

Heilman, Michael, "Automatic Factual Question Generation from Text", Language of Technologies Institute, Carnegie Mellon University, Pittsburgh, Pennsylvania, 2011.

Heilman, Michael, et al., "Question Generation via Overgenerating Transformations and Ranking", Language Technologies Institute, Carnegie Mellon University, Pittsburgh, Pennsylvania, 2009.

Yao, Xuchen, et al., "Semantics-based Question Generation and Implementation", pp. 11-42, 2012.

* cited by examiner

Maryland - 50 States - US Geography

We've removed some words from the sentence. Put them back in the right place!

Famed abolitionist Harriet Tubman was born into [ ▸ ] in Maryland, but escaped with help from the Underground [ ▸ ].

Resources  Practice ▾  Next ▸

Speed: 1    0:00 / 0:08

AUTOMATED GENERATION AND PRESENTATION OF LESSONS VIA DIGITAL MEDIA CONTENT EXTRACTION

CROSS REFERENCE TO RELATED APPLICATIONS

This patent document claims priority to: (1) U.S. Provisional Patent Application No. 62/331,490, filed May 4, 2016; and (2) U.S. Provisional Patent Application No. 62/428,260, filed Nov. 30, 2016. The disclosure of each priority application is incorporated into this document by reference.

This patent document is also related to U.S. patent application Ser. No. 15/415,314, filed Jan. 25, 2017, the disclosure of which is fully incorporated into this document by reference.

BACKGROUND

Cost effective, high quality, culturally sensitive and efficient systems for automatically creating skills development content that engages students have evaded the global market for skills development systems. Currently, language acquisition and language proficiency is accomplished through numerous, disparate methods including but not limited to classroom teaching, individual tutors, reading, writing, and content immersion. However, most content designed for language learning (such as a text book) is not engaging or of particular interest to a language learner. Other forms of learning, such as hiring individual tutors, can be prohibitively expensive.

Limitations in current technology do not permit the automatic development of language learning content that is both contextually-relevant and engaging to students.

This document describes methods and systems that are directed to solving at least some of the issues described above.

SUMMARY

In an embodiment, a system for automatically generating lessons based on content of a digital programming file includes a content analysis engine and a lesson generation engine, each of which comprises programming instructions stored on a memory device, and which are configured to cause a processor to perform certain functions. The content analysis engine will analyze a set of text corresponding to words spoken in a digital programming file, extract a sentence from the set of text, determine a start time and duration for the sentence, and generate a digital media clip that corresponds to the sentence. The digital media clip will have a start time in the digital programming file that corresponds to the start time of the sentence. A lesson generation engine will generate a lesson comprising an exercise that includes the digital media clip, along with a prompt that uses one or more key words that are extracted from the sentence.

The set of text may include a transcript having text segments as well as timestamps, each of which corresponds to one of the text segments. When analyzing the set of text and extracting the sentence from the set of text, the system may: (i) extract a sequential group of the text segments from the set of text; (ii) parse the group of text segments to identify the sentence within the group; and (iii) use the timestamps of each text segment that is at least partially included within the sentence to determine the start time and the duration for the sentence.

Optionally, when using the timestamps to determine the duration for a sentence, the system may: (i) identify a first text segment that is at least partially included in the sentence; (ii) determine a number of syllables of the first text segment that are in the sentence and a total number of syllables in the first text segment; (iii) determine a ratio of the number of syllables in the first text segment that are in the sentence and the total number of syllables in the first text segment; (iv) multiply the ratio by a duration of the first text segment to yield a segment duration; and (v) repeat steps (i)-(iv) for each text segment that is at least partially included in the sentence. The system may then sum the segment durations for each text segment that is at least partially included in the sentence to yield the duration for the sentence.

Optionally, when using the timestamps to determine start time for the sentence, the system may identify a first text segment that is at least partially included in the sentence. If the sentence starts at the beginning of the first text segment, the system may use a start time from the timestamp of the first text segment as the start time for the sentence. If the sentence does not start at the beginning of the first text segment, then the system may determine a number of syllables of the first text segment that are in the sentence and a total number of syllables in the first text segment, determine a ratio of the number of syllables in the first text segment that are in the sentence and the total number of syllables in the first text segment, multiply the ratio by a duration of the first text segment to yield a segment duration, and calculate the start time of the sentence as a sum of the start time from the timestamp of the first text segment plus the segment duration.

In some embodiments, the content analysis engine comprises may be configured to generate the transcript.

In various embodiments, examples of exercises may include one or more of the following: (i) a fill-in-the-blank exercise, in which the prompt is a blank in the sentence wherein a user may insert one of the key words in the blank; (ii) a sentence scramble exercise, in which the prompt is a field in which a user may arrange key words from the sentence in order; (iii) a word scramble exercise, in which the prompt is a field in which a user may arrange a set of letters into one of the key words; or (iv) a definition exercise, in which the prompt is a field in which a user may select a definition for one of the key words.

Optionally, the system also may include programming instructions that are configured to cause a media presentation device to, when outputting the lesson: (i) display the prompt in a prompt-and-response sector of a display of the media presentation device wherein a user may enter a response to the prompt; and (ii) display the digital media clip in a video presentation sector of the display with an actuator via which the user may cause the display device to play the digital media clip and output audio comprising the sentence.

Optionally, the system also may include programming instructions that are configured to cause a media presentation device to, when outputting the lesson: (ii) output the prompt; (ii) receive a spoken response to the prompt via an audio input device of the media presentation device; and (iv) output the digital media clip with an actuator via which the user may cause the di media presentation to play the digital media clip and output audio comprising the sentence.

BRIEF DESCRIPTION OF THE DRAWINGS

FIGS. 3 and 4 illustrate examples of how lessons created from digital videos may be presented.

DETAILED DESCRIPTION

Figure 1:
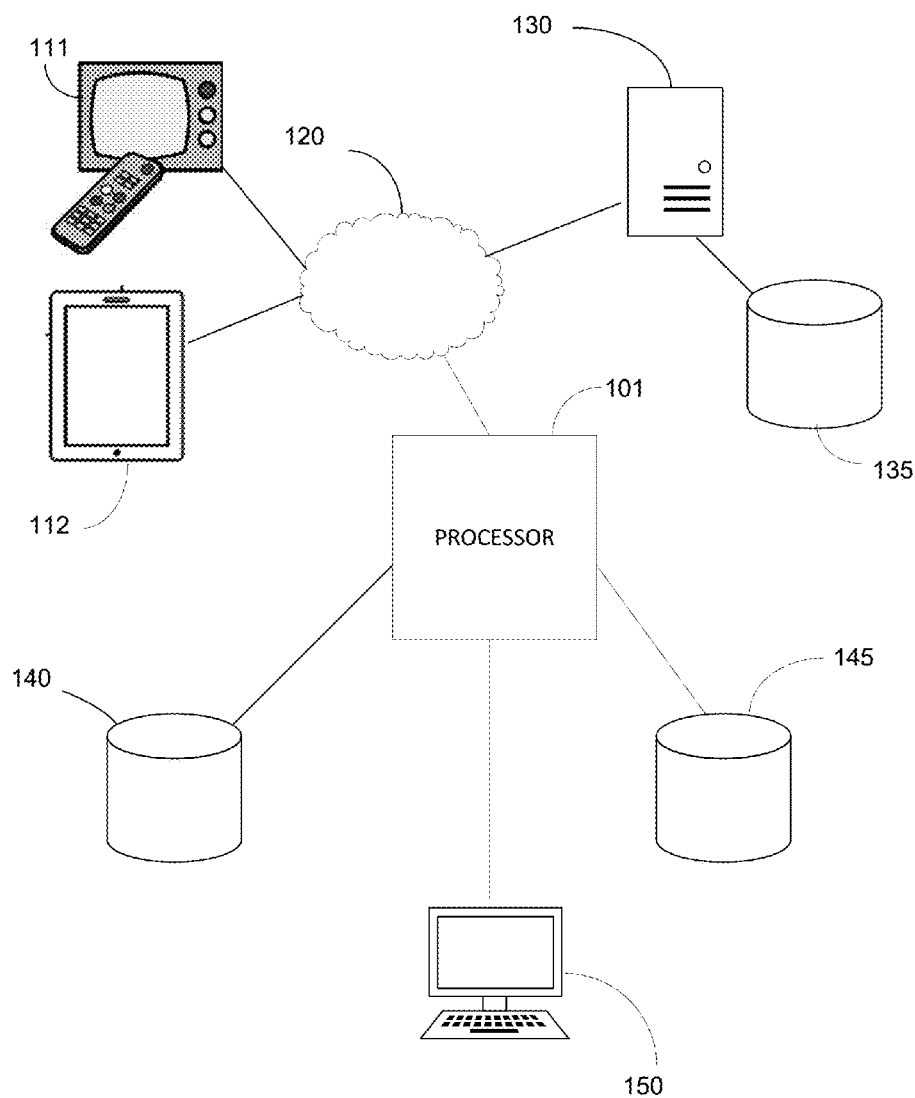
FIG. 1 illustrates a system that may be used to generate lessons based on content from digital media.

As used in this document, the singular forms "a," "an," and "the" include plural references unless the context clearly dictates otherwise. Unless defined otherwise, all technical and scientific terms used herein have the same meanings as commonly understood by one of ordinary skill in the art. As used in this document, the term "comprising" and each derivative of that term means "including, but not limited to."

As used in this document, the terms "digital media service" and "digital media delivery service" refer to a system, including transmission hardware and one or more non-transitory data storage media, that is configured to transmit digital content to one or more users of the service over a communications network such as the Internet, a wireless data network such as a cellular network or a broadband wireless network, a digital television broadcast channel or a cable television service. Digital content may include static content (such as web pages or electronic documents), dynamic content (such as web pages or document templates with a hyperlink to content hosted on a remote server), digital audio files or digital video files. For example, a digital media service may be a news and/or sports programming service that delivers live and/or recently recorded content relating to current events in video format, audio format and/or text format, optionally with images and/or closed-captions. Digital video files may include one or more tracks that are associated with the video, such as an audio channel, and optionally one or more text channels, such as closed captioning.

As used in this document, the terms "digital programming file" and "digital media asset" each refers to a digital file containing one or more units of audio and/or visual content that an audience member may receive from a digital media service and consume (listen to and/or view) on a content presentation device. A digital programming file may be transmitted as a downloadable file or in a streaming format. Thus, a digital media asset may include streaming media and media viewed via one or more client device applications, such as a web browser. Examples of digital media assets include, for example, videos, podcasts, news reports to be embedded in an Internet web page, and the like.

As used in this document, the term "digital video file" refers to a type of digital programming file containing one or more videos, with audio and/or closed-caption channels that an audience member may receive from a digital media delivery service and view on a content presentation device. A digital video file may be transmitted as a downloadable file or in a streaming format. Examples include, for example, videos that are presented on web pages, videos that are distributed by mobile computing device software applications, video podcasts and the like. Digital video files typically include visual (video) tracks and audio tracks. Digital video files also may include a data component, such as a closed caption track and/or transcript of the spoken audio component of the video. In some embodiments, the data component may be in a sidecar file that accompanies the digital video file so that, during video playback, the sidecar file and digital video file are multiplexed so that the closed captioning or transcript appears on a display device in synchronization with the video. In other embodiments, the data component may be in a separate digital file that provides a separately downloadable and viewable transcript of the audio component of a video file.

As used in this document, a "lesson" is a digital media asset, stored in a digital programming file or database or other electronic format, that contains content that is for use in skills development. For example, a lesson may include language learning content that is directed to teaching or training a user in a language that is not the user's native language.

A "media presentation device" refers to an electronic device that includes a processor, a computer-readable memory device, and an output interface for presenting the audio, video, data and/or text components of content from a digital programming file and/or from a lesson. Examples of output interfaces include, for example, digital display devices and audio speakers. The device's memory may contain programming instructions in the form of a software application that, when executed by the processor, causes the device to perform one or more operations according to the programming instructions. Examples of media presentation devices include personal computers, laptops, tablets, smartphones, media players, voice-activated digital home assistants and other Internet of Things devices, wearable virtual reality headsets and the like.

This document describes an innovative system and technological processes for developing material for use in content-based learning, such as language learning. Content-based learning is organized around the content that a learner consumes. By repurposing content, for example content of a digital video, to drive learning, the system may lead to improved efficacy in acquisition and improved proficiency in performance in the skills to which the system is targeted.

FIG. 1 illustrates a system that may be used to generate lessons that are contextually relevant to content from one or more digital video files. The system may include a central processing device 101, which is a set of one or more processing devices and one or more software programming modules that the processing device(s) execute to perform the functions of a content analysis engine and/or a lesson generation engine, as described below Multiple media presentation devices such as smart televisions 111 and/or computing devices 112 may be in direct or indirect communication with the processing device 101 via one or more communication networks 120. The media presentation devices receive digital video files in downloaded or streaming format and present the content associated with those digital video files to users of a video delivery service. Optionally, to view videos or hear audio content, each media presentation device may include a video presentation engine configured to cause a display device of the media presentation device to output a video served by the video delivery service, and/or it may include an audio content presentation engine configured to cause a speaker of the media presentation device to output an audio stream served by the video delivery service.

Any number of digital media services may contain one or more digital media servers 130 that include processors, communication hardware and a library of digital video files that the servers send to the media presentation devices via the network 120. The digital programming files may be stored in one or more data storage facilities 135. A digital media server 130 may transmit the digital programming files in a streaming format, so that the media presentation devices present the content from the digital programming files as the files are streamed by the digital media server 130. Alternatively, the digital media server 130 may make the digital programming files available for download to the media presentation devices. In addition, the digital media server 130 may make the digital programming files available to the processor 101 of the content analysis engine.

To implement the content analysis engine, the system also may include a data storage facility containing content analysis programming instructions 140 that are configured to cause the processor 101 to serve as the content analysis engine. The content analysis engine will extract segments of text corresponding to words spoken in the video or audio of a digital video or audio file, or words appearing in a digital document such as a web page. The text will appear in a transcript or other format such as a closed captioning track. The file may include a timestamp for some or all of the segments. The timestamp is data that can be used to measure the start time and duration of the segment. The content analysis engine may be a component of the digital media server 130 or a system associated with the digital media server 130, or it may be an independent service that may or may not be associated with the digital media server (such one of the media presentation devices or the processor 101 as shown in FIG. 1).

In some embodiments, the content analysis engine may identify a language of the extracted text, a named entity in the extracted text, and one or more parts of speech in the extracted text.

In some embodiments, the segments extracted by the content analysis engine will include one or more discrete sentences (each, a single sentence). In some embodiments, segments of extracted text may include phrases, clauses and other sub-sentential units as well as super-sentential units such as dialog turns, paragraphs, etc.

The system also may include a data storage facility containing a lesson generation programming instructions 145 that are configured to cause the processor to serve as a lesson generation engine. The lesson generation engine will automatically generate a set of questions for a lesson associated with the language.

In various embodiments the lesson may include set of prompts. For one or more of the prompts, a named entity that was extracted from the content may be part of the prompt or a response to the prompt. Similarly, one or more words that correspond to an extracted part of speech may be included in a prompt or in the response to the prompt. In other embodiments the set of prompts may include a prompt in which content of the single sentence is part of the prompt or the expected answer to the prompt.

In some embodiments, prior to performing text extraction, the content analysis engine may first determine whether the digital programming file satisfies one or more screening criteria for objectionable content. The system may require that the digital programming file satisfy the screening criteria before it will extract text and/or use the digital programming file in the generation of a lesson. Example procedures for determining whether a digital programming file satisfies screening criteria will be described below.

Optionally, the system may include an administrator computing device 150 that includes a user interface that allows an administrator to view and edit any component of a lesson before the lesson is presented to a user. Ultimately, the system will cause a user interface of a user's media presentation device (such as a user interface of the computing device 112) to output the lesson to a user. One possible format is a format by which the user interface outputs the prompts one at a time, a user may enter a response to each prompt, and the user interface outputs a next prompt after receiving each response.

Figure 2:
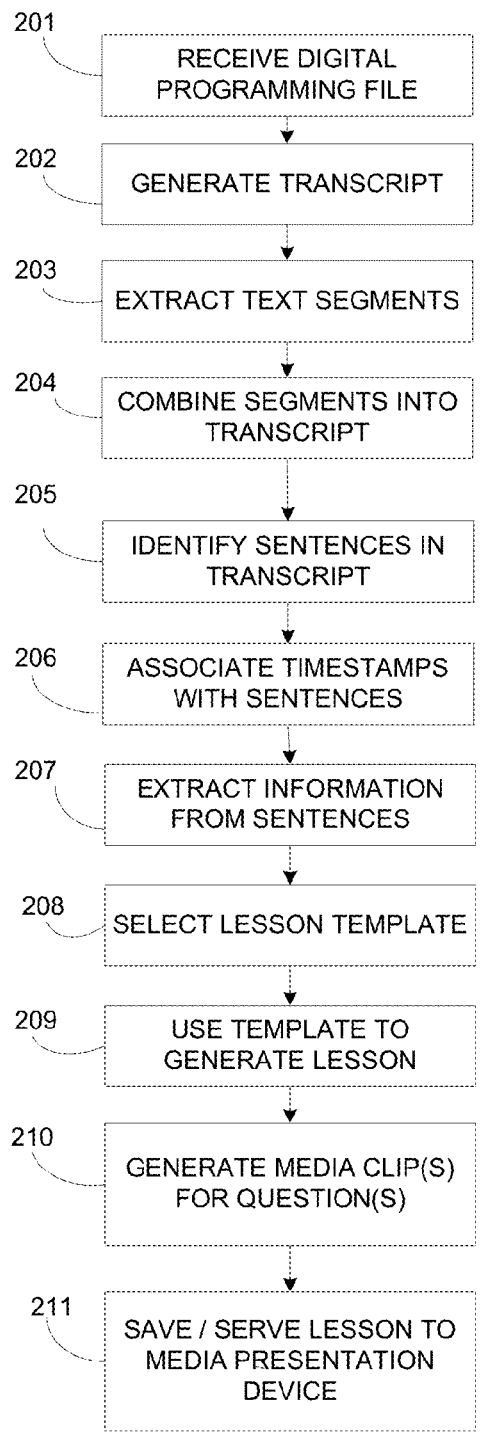
FIG. 2 is a process flow diagram of various elements of an embodiment of a lesson presentation system.

FIG. 2 is a process flow diagram of various elements of an embodiment of a learning system that automatically generates and presents a learning lesson that is relevant to a digital media asset. In this example, the lesson is a language learning lesson. In an embodiment, when a digital media server serves (or before the digital media server serves) a digital programming file to the content analysis engine, the content analysis engine will receive the digital programming file and 201 extract segments of text 203 from the digital programming file to identify suitable information to use in a lesson.

If the text is a transcript of an audio track, the system may identify and extract the text segments 203 by parsing the transcript of the text to find timestamps that identify a starting point for each segment. For example, a transcript may include start time and duration values for each segment, and the system may use these values to identify sentences in the transcript. By way of example, a transcript of a digital video may include the following sentences:

"Famed abolitionist Harriet Tubman was born into slavery in Maryland, but eventually escaped with help from the Underground Railroad. After her own escape, Tubman went on to lead more than 300 slaves north out of Maryland to freedom."

The transcript may break these two sentences into four consecutive text segments:

SEGMENT 1: <p t="45270" d="4839">Famed abolitionist Harriet Tubman was born into slavery in Maryland, but eventually escaped</p>

SEGMENT 2: <p t="50109" d=3183">with help from the Underground Railroad. After her own escape, </p>

SEGMENT 3: <p t="53292" d="3246">Tubman went on to lead more than 300 slaves north out of Maryland</p>

SEGMENT 4: <p t="56538" d="1010">to freedom.</p>

In each of the four text segments listed above, the segment starts with a timestamp in which t=start time and d=duration (in milliseconds) of the segment. (Other values of measurement may be used in other embodiments.) If multiple transcripts are available for various portions of the video, optionally the content analysis engine may combine the transcript segments into a single transcript 204.

If a transcript is not available, the system may automatically generate a transcript 202 by analyzing the audio and converting it to a text transcript using any suitable speech-to-text conversion technology.

Once the transcript is available and/or created, the system may parse the transcript into sentences 205. The system may do this using any suitable sentence parser, such as by using a lexicalized parser (an example of which is available from the Stanford Natural Language Processing Group.) This system may look for sequential strings of text and look for a start indicator (such as a capitalized word that follows a period, which may signal the start of a sentence or paragraph) and an end indicator (such as ending punctuation, such as a period, exclamation point or question mark to end a sentence, and which may signal the end of a paragraph if followed by a carriage return). In a digital audio file or digital video file, the system may analyze an audio track of the video file in order to identify pauses in the audio track having a length that at least equals a length threshold. A "pause" may in some embodiments be a segment of the audio track having a decibel level that is at or below a designated threshold decibel level. The system will select one of the pauses and an immediately subsequent pause in the audio track. In other embodiments the segmentation may happen via non-speech regions (e.g. music or background noise) or other such means. The system will process the content of the audio track that is present between the selected pause and the immediately subsequent pause to identify text associated with the content, and it will select the identified text as the single sentence. Alternatively, the content analysis engine may extract discrete sentences from an encoded data component. If so, the content analysis engine may parse the text and identify discrete sentences based on sentence formatting conventions such as those described above. For example, a group of words that is between two periods may be considered to be a sentence.

The system may also associate timestamps with one or more sentences 206 by placing timestamps in the transcript at locations that correspond to starting points and/or ending points of sentences. The timestamps in the transcript will correspond to times at which the text immediately following (or preceding) the timestamp appears in the actual audio track. Optionally, a timestamp also may include a duration value. The system may do this by retrieving all segments and partial segments that make up the sentence, and using the timestamps of those segments to generate the sentence timestamp. For example, the system may use the timestamp of the first segment that chronologically appears in the sentence as the timestamp for the sentence, and it may use a duration that is equal to the sum of all of the durations in the sentence. In the four-segment example listed above, the system may recognize that the four segments form a two-sentence sequence, it may associate t=45270 as the starting time of the two-sentence sentence, and it may associate a d=12278 (i.e., the sum of the four durations) as the duration of the two-sentence segment.

If sequential segments form a single sentence, then in step 206 the system may associate the timestamp with that single sentence. If sequential segments form a sequence of two or more sentences, then in step 206 the system may associate the timestamp with the sentence sequence. Alternatively, the system may combine a group of sequential segments that form a multiple-sentence set, parse the group into sentences in step 205, and associate timestamps with each individual sentence in step 206. The system may use the timestamps of each text segment that is at least partially included within a sentence to associate a timestamp with that sentence. To associate the timestamp with individual sentences in a multi-sentence sequence, the content analysis engine may determine a start time for each sentence. The system may do this by: (i) identifying a first segment in the sentence; (ii) determining a number of syllables in that segment; (iii) determining a ratio of the number of syllables that are in the sentence fragment to the number of syllables in the entire segment; and (iv) multiplying the syllable ratio by the total duration of the segment. The system will repeat this for each segment that is at least partially included in the sentence and determine a duration for each sentence as a sum of the segment durations.

By way of example, using the second sentence of the four-segment example presented above, the system may identify that the sentence starts within Segment 2 and terminates at the end of Segment 4. If the sentence started at the beginning of the segment, the start time would simply be 50109. But since it starts in the middle of the segment, the system will compute the start time by determining the syllable ratio of the segment's sentence fragment to that of the entire segment. (In this case, the ratio is 9 syllables in the sentence fragment/16 syllables in the entire segment.) The system will then multiply the syllable ratio (9/16) by the total duration of the segment (3183 ms) to obtain the duration (1790) The system will add the resulting duration to the start time of the segment 50109 to identify the sentence start time. Thus, in this example, the computed start time for the second sentence is: 9/16*3183+50109=51899 ms. The system will then determine the duration of the second sentence as a sum of the duration of Segment 2 in the sentence (9/16*3183=1740) plus the durations of all other segments in the sentence (in this case, Segments 3 and 4). This, the total duration is 9/16*3183+3246+1010=6046 ms.

In case a particular digital media player is not capable of processing a timestamp having values equal to the timestamp's values, the system may modify the timestamps to provide alternate values that are processable by the media player. For example, the system may round each start time and duration to the nearest second (from milliseconds) to account for video players that are unable to process millisecond timestamps. Other methods are possible.

The system may analyze the sentences to identify key words or other information to be used in the lesson. The key words may include, for example, words that define one or more topics, words that represent one or more named entities identified by named entity recognition (which will be described in more detail below), and/or words that represent an event from the analyzed content. The system may extract this information 207 from the content using any suitable content analysis method. For example, the system may process a transcript as described above and extract key words from the transcript. Alternatively, the system may process an audio track of the video with a speech-to-text conversion engine to yield text output, and then parse the text output to identify the language of the text output, the topic, the named entity, and/or the one or more parts of speech. Alternatively, the system may process a data component that contains closed captions by decoding the encoded data component, extracting the closed captions, and parsing the closed captions to identify the language of the text output, the topic, the named entity, and/or the one or more parts of speech. Suitable engines for assisting with these tasks include the Stanford Parser, the Stanford CoreNLP Natural Language Processing ToolKit (which can perform named entity recognition or "NER"), and the Stanford Log-Linear Part-of-Speech Tagger, the Dictionaries API (available for instance from Pearson). Alternatively, the NER can be programmed directly via various methods known in the field, such as finite-state transducers, conditional random fields or deep neural networks in a long short term memory (LSTM) configuration. One novel contribution to NER extraction is that the audio or video corresponding to the text may provide additional features, such as voice inflections, human faces, maps, etc. time-aligned with the candidate text for the NER. These time-aligned features are used in a secondary recognizer based on spatial and temporal information implemented as hidden Markov model, a conditional random field, a deep neural network or other methods. A meta-combiner, which votes based on the strength of the sub-recognizers (from text, video and audio), may produce the final NER output recognition. To provide additional detail, a conditional random field takes the form of:

$$p(y|\vec{x}) = \frac{1}{z(\vec{x})} \exp\left(\theta + \sum_{j=1}^{K} \theta_{y,j}(\vec{x})\right)$$

yielding the probability that there is a particular NER y given the input features in the vector x. And a meta-combiner does weighted voting from individual extractors as follows:

$$P(y \mid \vec{x}_1, \ldots \vec{x}_n) = w_j \min_{y_i}(p(y_i \mid \vec{x}_i)),$$

where w is the weight (confidence) of each extractor.

The system may then select a language learning lesson template 208 with which to use the key words, and automatically generates a lesson 209 according to the template. For example, the system may generate prompts with questions or other exercises in which the exercise is relevant to a topic, and/or in which the named entity or part of speech is part of the question, answer or other component of the exercise. The system may obtain a template for the exercise from a data storage facility containing candidate exercises such as (1) questions and associated answers, (2) missing word exercises, (3) sentence scramble exercises, and (4) multiple choice questions. The content of each exercise may include blanks in which named entities, parts of speech, or words relevant to the topic may be added. Optionally, if multiple candidate questions and/or answers are available, the system also may select a question/answer group having one or more attributes that correspond to an attribute in the profile (such as a topic of interest) for the user to whom the digital lesson will be presented. The template may include a rule set for a lesson that will generate a set of prompts. When using the lesson, when a user successfully completes an exercise the lesson may advance to a next prompt.

The prompts may be displayed on a display device and/or output by an audio speaker. The user may submit responses by keyboard, keypad, mouse or another input device. Alternatively or in addition, the system may enable the user to speak the response to the prompt, in which case a microphone will receive the response and the system will process the response using speech-to-text recognition to determine whether the response matches an expected response. In some embodiments, the speech-to-text recognition process may recognize whether the user correctly pronounced the response, and if the user did not do so the system may output an audio presentation of the response with correct pronunciation.

Optionally, the system also may access a profile for the audience member to whom the system presented the digital media asset and identify one or more attributes of the audience member. Such attributes may include, for example, geographic location, native language, preference categories (i.e., topics of interest), services to which the user subscribes, social connections, and other attributes. When selecting a lesson template 208, if multiple templates are available the system may select one of those templates having content that corresponds to the attributes of the audience member, such as a topic of interest. The measurement of correspondence may be done using any suitable algorithm, such as selection of the template having metadata that matches the most of the audience member's attributes. Optionally, certain attributes may be assigned greater weights, and the system may calculate a weighted measure of correspondence.

When generating a lesson the system also may generate foils for key words. For example, the system may generate a correct definition and one or more foils that are false definitions, in which each foil is an incorrect answer that includes a word associated with a key vocabulary word that was extracted from the context. To generate foils, the system may select one or more words from the content source that are based on the part of speech of a word in the definition such as plural noun, adjective (superlative), verb (tense) or other criteria, and include those words in the foil definition.

The lesson also may include one or more digital media clips for each exercise 210. Each digital media clip be a segment of the video and/or audio track of the digital programming file from which the sentences and/or key words that are used in the exercise were extracted. The system may generate each clip by selecting a segment of the programming file having a timestamp that corresponds to the starting timestamp of the exercise's sentence or sentence sequence, and a duration that corresponds to the duration of the exercise's sentence or sentence sequence. Timestamps may "correspond" if they match, if they are within a maximum threshold range of each other, or if they are a predetermined function of each other (such as 1 second before or 1 second after the other).

Optionally, in some embodiments before serving the lesson to the user the system may present the lesson (or any question/answer set within the lesson) to an administrator computing device on a user interface that enables an administrator to view and edit the lesson (or lesson portion).

The system will then save the lesson to a digital media server and/or serve the lesson to the audience member's media presentation device 211. Examples of this will be described below. The digital media server that serves the lesson may be the same one that served the digital video asset, or it may be a different server.

Optionally, when analyzing content of a digital programming file, the system may determine whether the digital programming file satisfies one or more screening criteria for objectionable content. The system may require that the digital programming file and/or extracted sentence(s) satisfy the screening criteria before it will extract text and/or use the digital programming file in generation of a lesson. If the digital programming file or extracted sentences do not satisfy the screening criteria—for example, if a screening score generated based on an analysis of one or more screening parameters exceeds a threshold—the system may skip that digital programming file and not use its content in lesson generation. Examples of such screening parameters may include parameters such as:

requiring that the digital programming file originate from a source that is a known legitimate source (as stored in a library of sources), such as a known news reporting service or a known journalist;

requiring that the digital programming file not originate from a source that is designated as blacklisted or otherwise suspect (as stored in a library of sources), such as a known "fake news" publisher;

requiring that the digital programming file originate from a source that is of at least a threshold age;

requiring that the digital programming file not contain any content that is considered to be obscene, profane or otherwise objectionable based on one or more filtering rules (such as filtering content containing one or more words that a library in the system tags as profane);

requiring that content of the digital programming file be verified by one or more registered users or administrators.

The system may develop an overall screening score using any suitable algorithm or trained model. As a simple example, the system may assign a point score for each of the parameters listed above (and/or other parameters) that the digital programming file fails to satisfy, sum the point scores to yield an overall screening score, and only use the digital programming file for lesson generation if the overall screening score is less than a threshold number. Other methods may be used, such as machine learning methods disclosed in, for example, U.S. Patent Application Publication Number 2016/0350675 filed by Laks et al., and U.S. Patent Application Publication Number 2016/0328453 filed by Galuten, the disclosures of which are fully incorporated into this document by reference.

FIG. 3 illustrates an example in which an exercise 301 of a lesson is presented to a user via a display device of a media presentation device. This exercise 301 is a fill-in-the-blank exercise, and it includes a display screen segment that is a prompt-and-response sector 303 that displays a sentence from a video, with key words removed in and replaced with blanks 304 which the student is to fill in. The prompt-and-response sector 303 may receive user input to fill in the blanks as free-form text, by a selection of a candidate word from a drop-down menu (as shown), or by some other input means. The exercise 301 also includes a video presentation sector 302 in that display segment of the video that corresponds to the sentence displayed in the prompt-and-response sector 303. The displayed video segment may be that created for the sentence using processes such as those described above in FIG. 2. The video presentation sector 302 may include a user actuator that receives commands from a user to start, pause, advance, go back, increase play speed, decrease play speed, show closed captions and/or hide closed captions in a video. When the user activates the actuator and causes the video to play, an audio output of the media presentation device may output audio comprising the sentence that is displayed in the prompt-and-response sector. In some embodiments, the prompt may not be displayed but instead may be only output via an audio output of the media presentation device.

Figure 4:
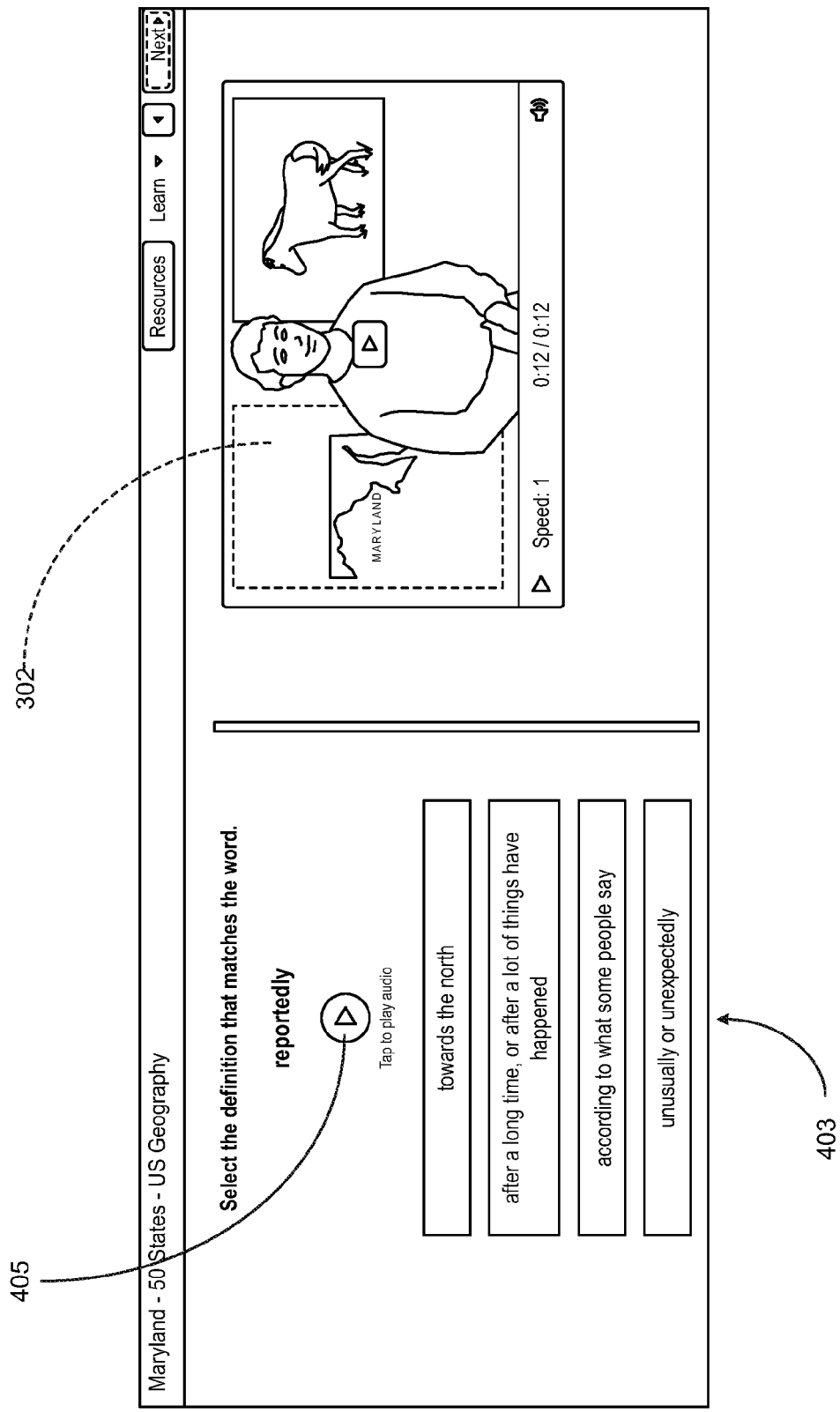

The prompt-and-response sector also may include other prompts, such as a sentence scramble exercise with a prompt to rearrange a list of words into a logical sentence (in which case the video segment displayed in the video presentation sector may be cued to the part of the video in which the sentence is spoken). Another possible prompt is a word scramble exercise with a prompt to rearrange a group of letters to make a word. The word will appear in a sentence spoken during the corresponding video segment. Another possible prompt is that of a definition exercise as shown in FIG. 4, in which the prompt displayed in the prompt-and-response sector is 403 to select a definition to match a particular word. The particular word may be displayed as shown, or it may be output by receiving a user selection of an audio output command 405. Other prompts are possible.

When presenting a lesson to a user, the system may analyze a user's response to each prompt to determine whether the response matches the correct response for the prompt. If the response is incorrect the prompt-and-response sector or another segment of the display, or an audio output, may output an indication of incorrectness such as an icon or word stating that the response is incorrect. On the other hand, if the response is correct the user's media presentation device may advance to the next exercise in the lesson and output a new prompt.

Thus, the systems and methods described in this document may leverage and repurpose content into short, pedagogically structured, topical, useful and relevant lessons for the purpose of learning and practice of language and/or other skills on a global platform that integrates the content with a global community of users. In some embodiments, the system may include an ability to communicate between users that includes, but is not limited to, text chat, audio chat and video chat. In some situations, the lessons may include functionality for instruction through listening dictation, selection of key words for vocabulary study and key grammatical constructions (or very frequent collocations).

Figure 5:
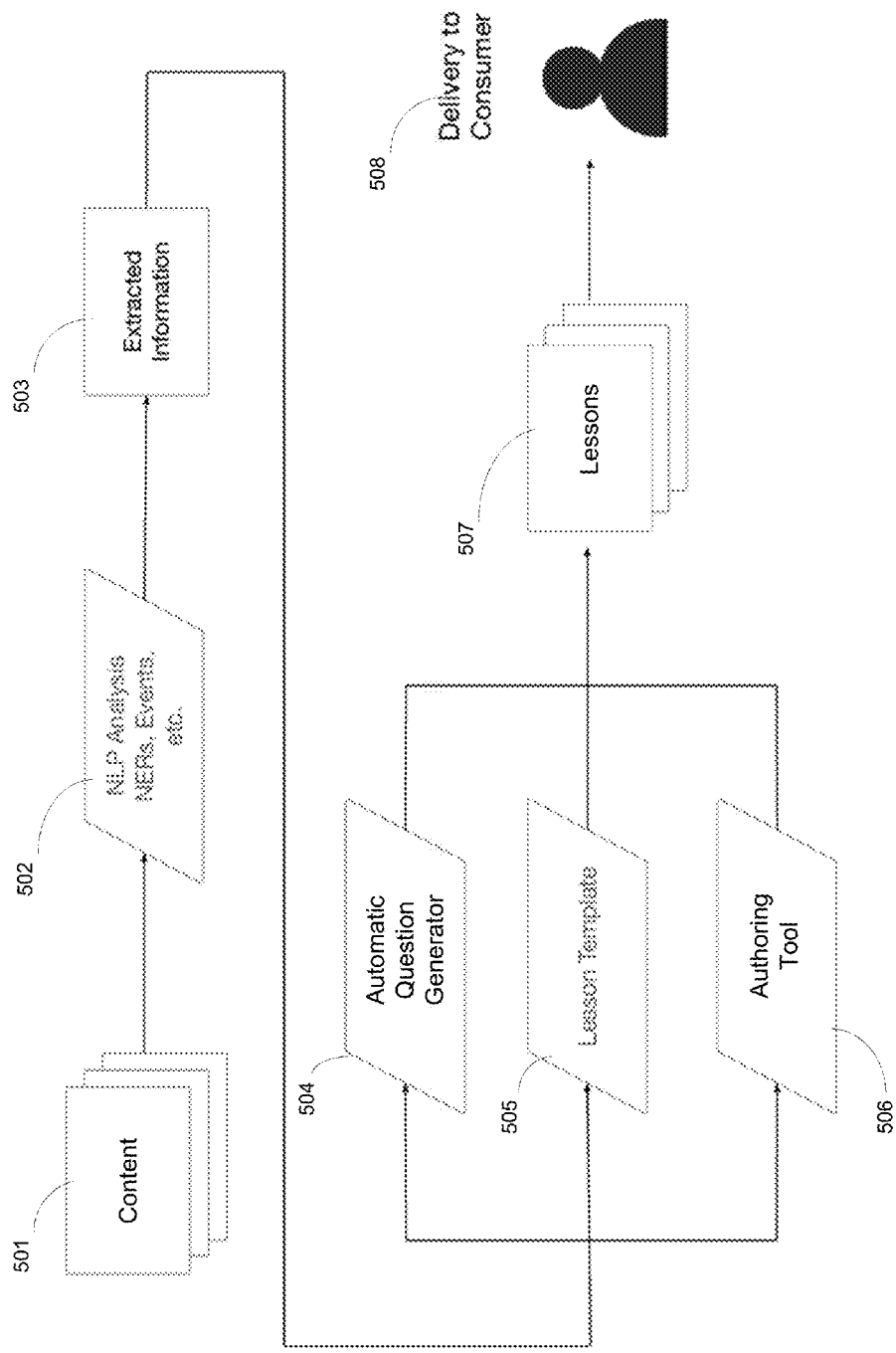
FIG. 5 illustrates additional process flow examples.

FIG. 5 illustrates an additional process flow. Content 501 of a video (including accompanying text and/or audio that provides information about current news events, business, sports, travel, entertainment, or other consumable information) or other digital programming file will include text in the form of words, sentences, paragraphs, and the like. The extracted text may be integrated into a Natural Language Processing analysis methodology 502 that may include NER, recognition of events, and key word extraction. NER is a method of information extraction that works by locating and classifying elements in text into pre-defined categories (each, an "entity") that is used to identify a person, place or thing. Examples of entities include the names of persons, organizations, locations, expressions of times, quantities, monetary values, percentages, etc. Events are activities or things that occurred or will occur, such as sporting events (e.g., basketball or football games, car or horse races, etc.), news events (e.g., elections, weather phenomena, corporate press releases, etc.), or cultural events (e.g., concerts, plays, etc.). Key word extraction is the identification of key words (which may include single words or groups of words—i.e., phrases) that the system identifies as "key" by any now or hereafter known identification process such as document classification and/or categorization and word frequency differential. The key word extraction process may look not only at single words that appear more frequently than others, but also at semantically related words, which the system may group together and consider to count toward the identification of a single key word.

The resulting output (extracted information 503) may be integrated into several components of a lesson generator, which may include components such as an automatic question generator 504, lesson template 505 (such as a rubric of questions and answers with blanks to be filled in with extracted information and/or semantically related information), and one or more authoring tools 506. Optionally, before using any material to generate a lesson, the lesson generator may ensure that the content analysis engine has first ensured that the material satisfies one or more screening criteria for objectionable content, using screening processes such as those described above.

The automatic question generator 504 creates prompts for use in lessons based on content of the digital media asset. (In this context, a question may be an actual question, or it may be a prompt such as a fill-in-the-blank or true/false sentence.) For example, after the system extracts the entities and events from content of the digital programming file, it may: (1) rank events by how central they are to the content (e.g. those mentioned more than once, or those in the lead paragraph are more central and thus ranked higher); (2) cast the events into a standard template, via dependency parsing or a similar process, thus producing, for example: (a) Entity A did action B to entity C in location D, or (b) Entity A did action B which resulted in consequence E. The system may then (3) automatically create a fill-in-the-blank, multiple choice or other question based on the standard template. As an example, if the digital media asset content was a news story with the text: "Russia extended its bombing campaign to the town of Al Haddad near the Turkmen-held region in Syria in support of Assad's offensive," then a multiple choice or fill-in-the-blank automatically generated question might be "Russia bombed _____ in Syria." Possible answers to the question may include: (a) Assad; (b) Al Haddad; (c) Turkmen; and/or (d) ISIS, in which one of the answers is the correct named entity and the other answers are foils. In at least some embodiments, the method would not generate questions for the parts of the text that cannot be mapped automatically to a standard event template.

The lesson template 505 is a digital file containing default content, structural rules, and one or more variable data fields that is pedagogically structured and formatted for language learning. The template may include certain static content, such as words for vocabulary, grammar, phrases, cultural notes and other components of a lesson, along with variable data fields that may be populated with named entities, parts of speech, or sentence fragments extracted from a video.

The authoring tool 506 provides for a post-editing capability to refine the output based on quality control requirements for the lessons. The authoring tool 506 may include a processor and programming instructions that outputs the content of a lesson to an administrator via a user interface (e.g., a display) of a computing device, with input capabilities that enable the administrator to modify, delete, add to, or replace any of the lesson content. The modified lesson may then be saved to a data file for later presentation to an audience member 508.

Lesson production yields lessons 507 that are then either fully automated or partially seeded for final edits.

The system may then apply matching algorithms to customer/user profile data and route the lessons to a target individual user for language learning and language practice. Example algorithms include those described in United States Patent Application Publication Number 2014/0222806, titled "Matching Users of a Network Based on Profile Data", filed by Carbonell et al. and published Aug. 7, 2014.

Figure 6:
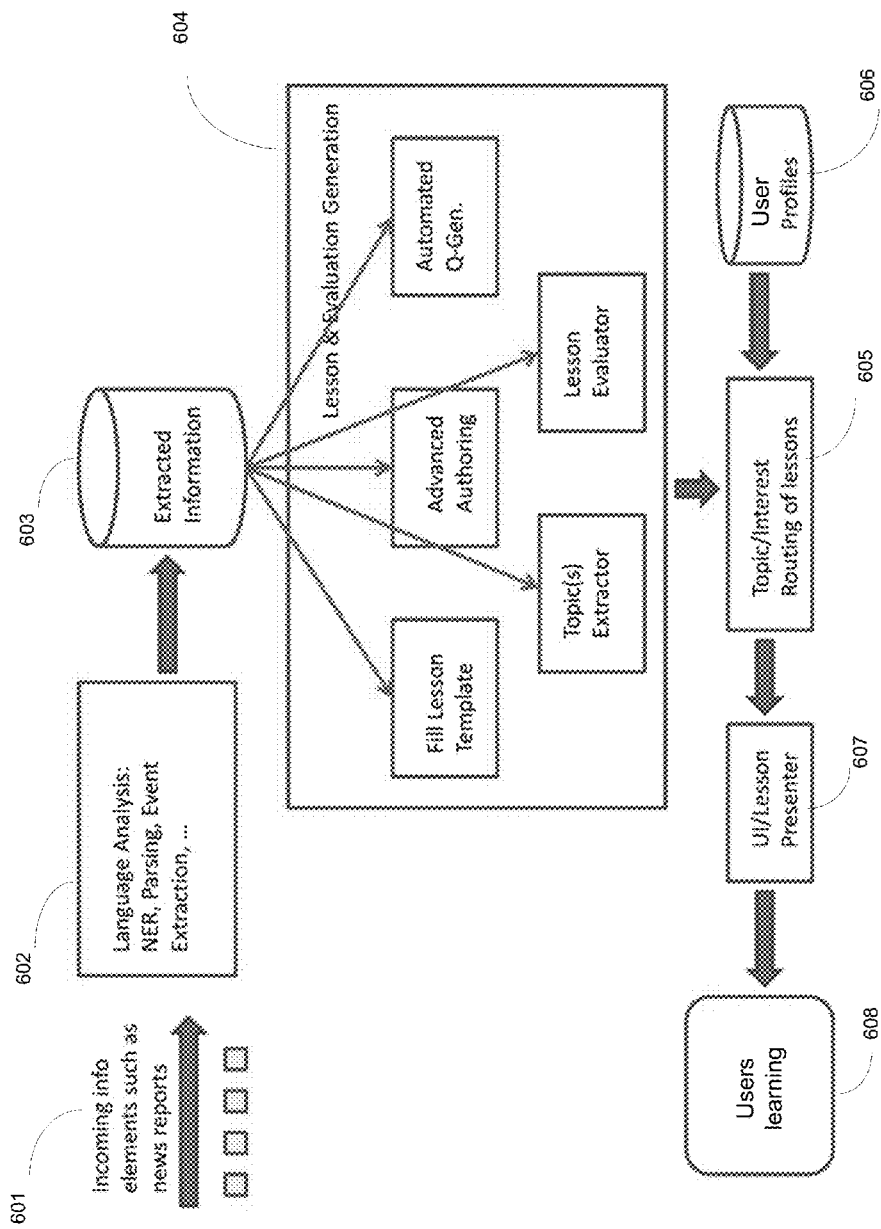
FIG. 6 illustrates additional details of an automated lesson generation process.

FIG. 6 illustrates additional details of an example of an automated lesson generation process, in this case focusing on the actions that the system may take to automatically generate a lesson. As with the previous figure, here the system may receive content 601, which may include textual, audio and/or video content. In one embodiment such content includes news stories. In other embodiments the content may include narratives such as stories, in another embodiment the content may include specially produced educational materials, and in other embodiments the content may include different subject matter.

The system in FIG. 6 uses automated text analysis techniques 602, such as classification/categorization to extract topics such as "sports" or "politics" or more refined topics such as "World Series" or "Democratic primary." The methods used for automated topic categorization may be based the presence of keywords and key phrases. In addition or alternatively, the methods may be machine learning methods trained from topic-labeled texts, including decision trees, support-vector machines, neural networks, logistic regression, or any other supervised or unsupervised machine learning method. Another part of the text analysis may include automatically identifying named entities in the text, such as people, organizations and places. These techniques may be based on finite state transducers, hidden Markov models, conditional random fields, deep neural networks with LSTM methods or such other techniques as a person of skill in the art will understand, such as those discussed above or other similar processes and algorithms from machine learning. Another part of the text analysis may include automatically identifying and extracting events from the text such as who-did-what-to-whom (for example, voters electing a president, or company X selling product Y to customers Z). These methods may include, for example, those used for identifying and extracting named entities, and also may include natural language parsing methods, such as phrase-structure parsers, dependency parsers and semantic parsers.

In 604, the system addresses creation of lessons and evaluations based on the extracted information. These lessons can include highlighting/repeating/rephrasing extracted content. The lessons can also include self-study guides based on the content. The lessons can also include automatically generated questions based on the extracted information (such as "who was elected president", or "who won the presidential election"), presented in free form, in multiple-choice selections, as a sentence scramble, as a fill-in-the-blank prompt, or in any other format understandable to a student. Lessons are guided by lesson templates that specify the kind of information, the quantity, the format, and/or the sequencing and the presentation mode, depending on the input material and the level of difficulty. In one embodiment, a human teacher or tutor interacts with the extracted information 603, and uses advanced authoring tools to create the lesson. In another embodiment the lesson creation is automated, using the same resources available to the human teacher, plus algorithms for selecting and sequencing content to fill in the lesson templates and formulate questions for the students. These algorithms are based on programmed steps and machine learning-by-observation methods that replicate the observed processes of the human teachers. Such algorithms may be based on graphical models, deep neural nets, recurrent neural network algorithms or other machine learning methods.

Finally, lessons are coupled with extracted topics and matched with the profiles of users 606 (students) so that the appropriate lessons may be routed to the appropriate users 605. The matching process may be done by a similarity metric, such as dot-product, cosine similarity, inverse Euclidean distance, or any other well-defined matching methods of interests vs. topics, such as the methods taught in United States Patent Application Publication Number 2014/0222806, titled "Matching Users of a Network Based on Profile Data", filed by Carbonell et al. and published Aug. 7, 2014. Each lesson may then be presented to the user 607 via a user interface (e.g., display device) of the user's media presentation device so that the user is assisted in learning 608 a skill that is covered by the lesson.

Optionally, the system may include additional features when generating a lesson. For example, the system may present the student user with a set of categories, such as sports, world news, or the arts, and allow the user to select a category. The system may then search its content server or other data set to identify one or more digital programming files that are tagged with the selected category. The system may present indicia of each retrieved digital programming file to the user so that the user can select any of the programming files for viewing and/or lesson generation. The system will then use the selected digital programming files as content sources for lesson generation using the processes described above.

Example lessons that the system may generate include:

(1) Vocabulary lessons, in which words extracted from the text (or variants of the word, such as a different tense of the word) are presented to a user along with a correct definition and one or more distractor definitions (also referred to as "foil definitions") so that the user may select the correct definition in response to the prompt. The distractor definitions may optionally contain content that is relevant to or extracted from the text.

(2) Fill-in-the-blank prompts, in which the system presents the user with a paragraph, sentence or sentence fragment. Words extracted from the text (or variants of the word, such as a different tense of the word) must be used to fill in the blanks.

Figure 7:
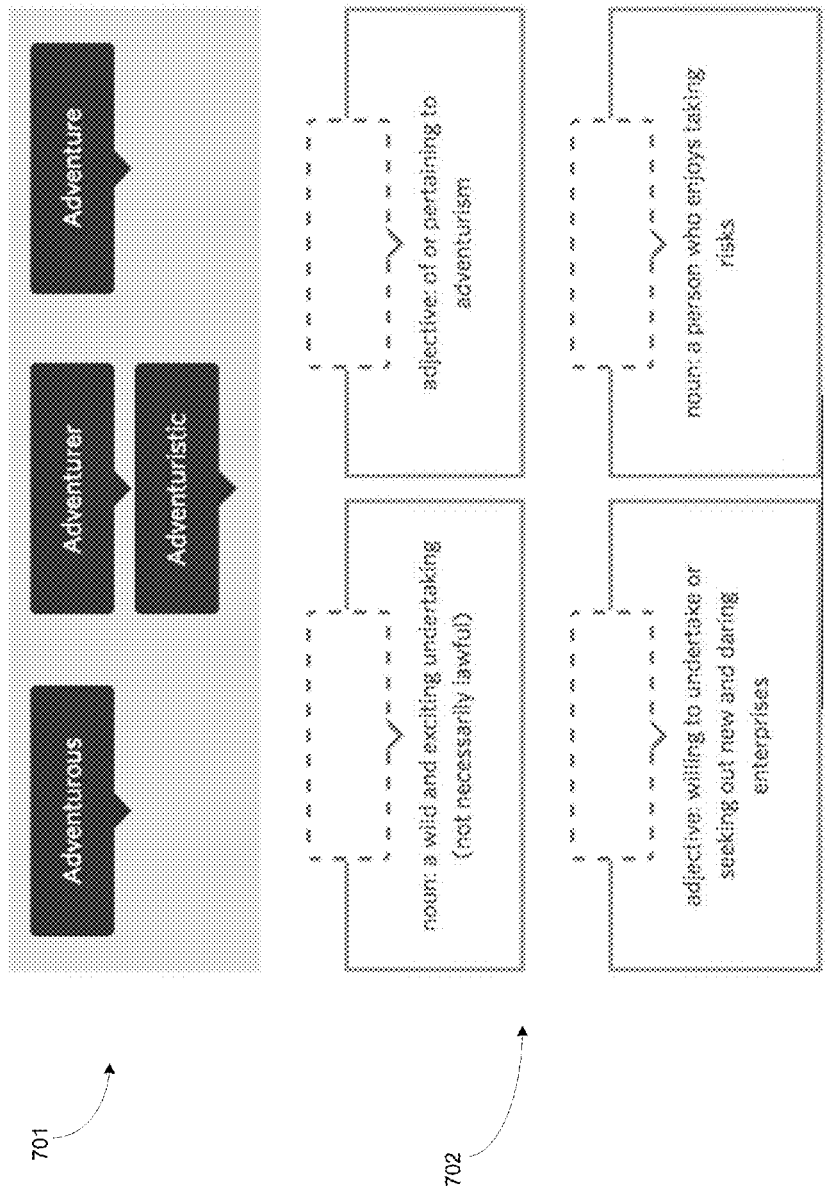
FIG. 7 illustrates an example word-definition matching exercise.

(3) Word family questions, in which the system takes one or more words from the digital programming file and generates other forms of the word (such as tenses). The system may then identify a definition for each form of the word (such as by retrieving the definition from a data store) and optionally one or more distractor definitions and ask the user to match each variant of the word with its correct definition. FIG. 7 illustrates an example screenshot of such an exercise, with a sector 701 displaying a set of words and a second sector 702 displaying a set of definitions. A user may match words with definitions using a drag-and-drop input or other matching action.

(4) Opposites, in which the system outputs a word from the text and prompts the user to enter or select a word that is an opposite of the presented word. Alternatively, the system may require the user to enter a word from the content that is the opposite of the presented word.

(5) Sentence scrambles, in which the system presents a set of words that the user must rearrange into a logical sentence. Optionally, some or all of the words may be extracted from the content.

Figure 8:
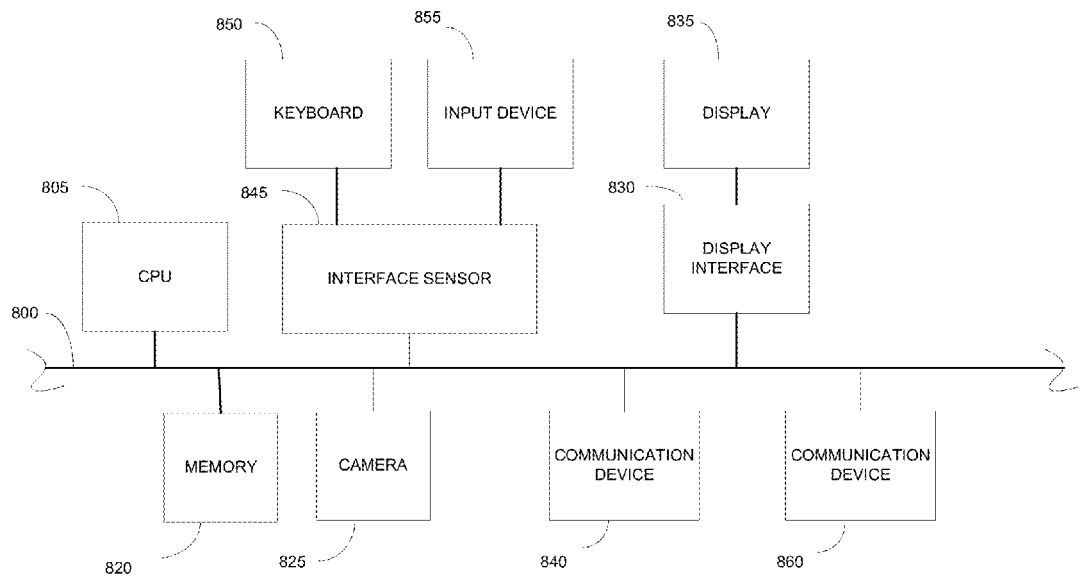
FIG. 8 shows various examples of hardware that may be used in various embodiments.

FIG. 8 depicts an example of internal hardware that may be included in any of the electronic components of the system, an electronic device, or a remote server. An electrical bus 800 serves as an information highway interconnecting the other illustrated components of the hardware. Processor 805 is a central processing device of the system, i.e., a computer hardware processor configured to perform calculations and logic operations required to execute programming instructions. As used in this document and in the claims, the terms "processor" and "processing device" are intended to include both single-processing device embodiments and embodiments in which multiple processing devices together or collectively perform a process. Similarly, a server may include a single processor-containing device or a collection of multiple processor-containing devices that together perform a process. The processing device may be a physical processing device, a virtual device contained within another processing device (such as a virtual machine), or a container included within a processing device.

Read only memory (ROM), random access memory (RAM), flash memory, hard drives and other devices capable of storing electronic data constitute examples of memory devices 820. Except where specifically stated otherwise, in this document the terms "memory," "memory device," "data store," "data storage facility" and the like are intended to include single device embodiments, embodiments in which multiple memory devices together or collectively store a set of data or instructions, as well as individual sectors within such devices.

An optional display interface 830 may permit information from the bus 800 to be displayed on a display device 835 in visual, graphic or alphanumeric format. An audio interface and audio output 860 (such as a speaker) also may be provided. Communication with external devices may occur using various communication devices 840 such as a transmitter and/or receiver, antenna, a radio frequency identification (RFID) tag and/or short-range or near-field communication circuitry. A communication device 840 may be attached to a communications network, such as the Internet, a local area network or a cellular telephone data network.

The hardware may also include a user interface sensor 845 that allows for receipt of data from input devices such as a keyboard 850, a mouse, a joystick, a touch screen, a remote control, a pointing device, a video input device and/or an audio input device 855. Data also may be received from a video capturing device 825 or device that receives positional data from an external global positioning system (GPS) network.

While the embodiments described above use the example of a digital video file, one of skill in the art will recognize that the methods described above may be used with an audio-only file that includes an accompanying transcript, such as an audio podcast, a streaming radio service, and the like. Digital audio files may be distributed by a digital media service, such as a video delivery service, an online streaming service, and the like.

The above-disclosed features and functions, as well as alternatives, may be combined into many other different systems or applications. Various presently unforeseen or unanticipated alternatives, modifications, variations or improvements may be made by those skilled in the art, each of which is also intended to be encompassed by the disclosed embodiments.

The invention claimed is:

1. A system for automatically generating lessons based on content of a digital programming file, comprising:
   a content analysis engine comprising programming instructions that are configured to cause a processor to:
   analyze a set of text corresponding to words spoken in a digital programming file, wherein the set of text comprises a transcript that includes a plurality of text segments and a plurality of timestamps each corresponding to one of the text segments,
   extract a sentence from the set of text by:
      extracting a sequential group of the text segments from the set of text,
      parsing the group of text segments to identify the sentence within the group, and
      using the timestamps of each text segment that is at least partially included within the sentence to determine a start time and a duration for the sentence by:
         (i) identifying a first text segment that is at least partially included in the sentence,
         (ii) determining a number of syllables of the first text segment that are in the sentence and a total number of syllables in the first text segment,
         (iii) determining a ratio of the number of syllables in the first text segment that are in the sentence and the total number of syllables in the first text segment,
         (iv) multiplying the ratio by a duration of the first text segment to yield a segment duration for the first text segment,
         (v) repeating steps (i)-(iv) for each text segment that is at least partially included in the sentence, and
         (vi) summing the segment durations for each text segment that is at least partially included in the sentence to yield the duration for the sentence, and
   generate a digital media clip that corresponds to the sentence, wherein the digital media clip has a start time in the digital programming file that corresponds to the start time of the sentence; and a lesson generation engine comprising programming instructions that are configured to cause a processor to generate a lesson comprising an exercise that includes:
a prompt that uses one or more key words that are extracted from the sentence, and
the digital media clip.

2. The system of claim 1, wherein the instructions to use the timestamps of each text segment that is at least partially included within the sentence to determine the start time for the sentence also comprise instructions to:
if the sentence starts at the beginning of the first text segment, use a start time from the timestamp of the first text segment as the start time for the sentence; and
calculate the start time of the sentence as a sum of the start time from the timestamp of the first text segment plus the segment duration for the first text segment.

3. The system of claim 1, wherein the content analysis engine comprises additional programming instructions that are configured to cause a processor to generate the transcript.

4. The system of claim 1, wherein:
the exercise comprises a fill-in-the-blank exercise, and the prompt is a blank in the sentence wherein a user may insert one of the key words in the blank;
the exercise comprises a sentence scramble exercise, and the prompt is a field in which a user may arrange key words from the sentence in order;
the exercise comprises a word scramble exercise, and the prompt is a field in which a user may arrange a set of letters into one of the key words; or
the exercise comprises a definition exercise, and the prompt is a field in which a user may select a definition for one of the key words.

5. The system of claim 1, wherein the programming instructions that are configured to cause a processor to generate the lesson comprising the exercise comprise instructions that are configured to cause a media presentation device to, when outputting the lesson:
display the prompt in a prompt-and-response sector of a display of the media presentation device wherein a user may enter a response to the prompt; and
display the digital media clip in a video presentation sector of the display with an actuator via which the user may cause the display device to play the digital media clip and output audio comprising the sentence.

6. The system of claim 1, wherein the programming instructions that are configured to cause a processor to generate the lesson comprising the exercise comprise instructions that are configured to cause a media presentation device to, when outputting the lesson:
output the prompt;
receive a spoken response to the prompt via an audio input device of the media presentation device; and
output the digital media clip with an actuator via which the user may cause the media presentation to play the digital media clip and output audio comprising the sentence.

7. The system of claim 1, wherein one or more of the key words comprise a named entity or event extracted from the sentence.

8. The system of claim 1, wherein the programming instructions that are configured to cause a processor to generate the lesson comprising the exercise comprise instructions that are configured to cause a media presentation device to, when outputting the lesson:
output the prompt;

receive a spoken response to the prompt via an audio input device of the media presentation device; and
output the digital media clip with an actuator via which the user may cause the media presentation to play the digital media clip and output audio comprising the sentence.

9. The system of claim 1, wherein one or more of the key words comprise a named entity or event extracted from the sentence.

10. A method of automatically generating lessons based on content of a digital programming file, the method comprising:
by a content analysis engine processor, executing programming instructions that cause the content analysis engine processor to:
analyze a set of text, corresponding to words spoken in a digital programming file, wherein the set of text comprises a transcript that includes a plurality of text segments and a plurality of timestamps each corresponding to one of the text segments,
extract a sentence from the set of text by:
extracting a sequential group of the text segments from the set of text,
parsing the group of text segments to identify the sentence within the group, and
using the timestamps of each text segment that is at least partially included within the sentence to determine a start time and a duration for the sentence by:
(i) identifying a first text segment that is at least partially included in the sentence,
(ii) determining a number of syllables of the first text segment that are in the sentence and a total number of syllables in the first text segment,
(iii) determining a ratio of the number of syllables in the first text segment that are in the sentence and the total number of syllables in the first text segment,
(iv) multiplying the ratio by a duration of the first text segment to yield a segment duration for the first text segment,
(v) repeating steps (i)-(iv) for each text segment that is at least partially included in the sentence, and
(vi) summing the segment durations for each text segment that is at least partially included in the sentence to yield the duration for the sentence, and
generate a digital media clip that corresponds to the sentence, wherein the digital media clip has a start time in the digital programming file that corresponds to the start time of the sentence; and
by a lesson generation engine processor, executing programming instructions that cause the lesson generation engine processor to generate a lesson comprising an exercise that includes:
a prompt that uses one or more key words that are extracted from the sentence, and
the digital media clip.

11. The method of claim 10, wherein using the timestamps of each text segment that is at least partially included within the sentence to determine the start time for the sentence also comprises:
if the sentence starts at the beginning of the first text segment, using a start time from the timestamp of the first text segment as the start time for the sentence; and calculating the start time of the sentence as a sum of the start time from the timestamp of the first text segment plus the segment duration for the first text segment.

12. The method of claim 10 further comprising, by the content analysis engine, generating the transcript.

13. The method of claim 10, wherein:
the exercise comprises a fill-in-the-blank exercise, and the prompt is a blank in the sentence wherein a user may insert one of the key words in the blank;
the exercise comprises a sentence scramble exercise, and the prompt is a field in which a user may arrange key words from the sentence in order;
the exercise comprises a word scramble exercise, and the prompt is a field in which a user may arrange a set of letters into one of the key words; or
the exercise comprises a definition exercise, and the prompt is a field in which a user may select a definition for one of the key words.

14. The method of claim 10 further comprising causing a media presentation device to, when outputting the lesson, to:
display the prompt in a prompt-and-response sector of a display of the media presentation device wherein a user may enter a response to the prompt; and
display the digital media clip in a video presentation sector of the display with an actuator via which the user may cause the display device to play the digital media clip and output audio comprising the sentence.

15. The method of claim 10 further comprising causing a media presentation device to, when outputting the lesson:
output the prompt;
receive a spoken response to the prompt from a user via an audio input device of the media presentation device; and
output the digital media clip with an actuator via which the user may cause the media presentation device to play the digital media clip and output audio comprising the sentence.

16. The method of claim 10, wherein one or more of the key words comprise a named entity or event extracted from the sentence.

17. A system for automatically generating lessons based on content of a digital programming file, comprising:
a content analysis engine comprising programming instructions that are configured to cause a processor to:
analyze a set of text corresponding to words spoken in a digital programming file, wherein the set of text comprises a transcript that includes a plurality of text segments and a plurality of timestamps each corresponding to one of the text segments,
extract a sentence from the set of text by:
extracting a sequential group of the text segments from the set of text,
parsing the group of text segments to identify the sentence within the group, and
using the timestamps of each text segment that is at least partially included within the sentence to determine a start time and a duration for the sentence by:
identifying a first text segment that is at least partially included in the sentence,
if the sentence starts at the beginning of the first text segment, using a start time from the timestamp of the first text segment as the start time for the sentence, and
if the sentence does not start at the beginning of the first text segment:
determining a number of syllables of the first text segment that are in the sentence and a total number of syllables in the first text segment,
determining a ratio of the number of syllables in the first text segment that are in the sentence and the total number of syllables in the first text segment,
multiplying the ratio by a duration of the first text segment to yield a segment duration for the first text segment, and
calculating the start time of the sentence as a sum of the start time from the timestamp of the first text segment plus the segment duration for the first text segment, and
generate a digital media clip that corresponds to the sentence, wherein the digital media clip has a start time in the digital programming file that corresponds to the start time of the sentence; and
a lesson generation engine comprising programming instructions that are configured to cause a processor to generate a lesson comprising an exercise that includes:
a prompt that uses one or more key words that are extracted from the sentence, and
the digital media clip.

18. The system of claim 17, wherein the content analysis engine comprises additional programming instructions that are configured to cause a processor to generate the transcript.

19. The system of claim 17, wherein:
the exercise comprises a fill-in-the-blank exercise, and the prompt is a blank in the sentence wherein a user may insert one of the key words in the blank;
the exercise comprises a sentence scramble exercise, and the prompt is a field in which a user may arrange key words from the sentence in order;
the exercise comprises a word scramble exercise, and the prompt is a field in which a user may arrange a set of letters into one of the key words; or
the exercise comprises a definition exercise, and the prompt is a field in which a user may select a definition for one of the key words.

20. The system of claim 17, wherein the programming instructions that are configured to cause a processor to generate the lesson comprising the exercise comprise instructions that are configured to cause a media presentation device to, when outputting the lesson:
display the prompt in a prompt-and-response sector of a display of the media presentation device wherein a user may enter a response to the prompt; and
display the digital media clip in a video presentation sector of the display with an actuator via which the user may cause the display device to play the digital media clip and output audio comprising the sentence.

21. A method of automatically generating lessons based on content of a digital programming file, the method comprising:
by a content analysis engine processor, executing programming instructions that cause the content analysis engine processor to:
analyze a set of text corresponding to words spoken in a digital programming file, wherein the set of text comprises a transcript that includes a plurality of text segments and a plurality of timestamps each corresponding to one of the text segments,
extract a sentence from the set of text by:
extracting a sequential group of the text segments from the set of text, parsing the group of text segments to identify the sentence within the group, and using the timestamps of each text segment that is at least partially included within the sentence to determine a start time and a duration for the sentence by:

identifying a first text segment that is at least partially included in the sentence, if the sentence starts at the beginning of the first text segment, using a start time from the timestamp of the first text segment as the start time for the sentence, and if the sentence does not start at the beginning of the first text segment:

determining a number of syllables of the first text segment that are in the sentence and a total number of syllables in the first text segment, determining a ratio of the number of syllables in the first text segment that are in the sentence and the total number of syllables in the first text segment, multiplying the ratio by a duration of the first text segment to yield a segment duration for the first text segment, and calculating the start time of the sentence as a sum of the start time from the timestamp of the first text segment plus the segment duration for the first text segment, and generate a digital media clip that corresponds to the sentence, wherein the digital media clip has a start time in the digital programming file that corresponds to the start time of the sentence; and by a lesson generation engine processor, executing programming instructions that cause the lesson generation engine processor to generate a lesson comprising an exercise that includes:

a prompt that uses one or more key words that are extracted from the sentence, and the digital media clip.

22. The method of claim 21 further comprising, by the content analysis engine, generating the transcript.

23. The method of claim 21, wherein:

the exercise comprises a fill-in-the-blank exercise, and the prompt is a blank in the sentence wherein a user may insert one of the key words in the blank;

the exercise comprises a sentence scramble exercise, and the prompt is a field in which a user may arrange key words from the sentence in order;

the exercise comprises a word scramble exercise, and the prompt is a field in which a user may arrange a set of letters into one of the key words; or the exercise comprises a definition exercise, and the prompt is a field in which a user may select a definition for one of the key words.

24. The method of claim 21 further comprising causing a media presentation device to, when outputting the lesson, to:

display the prompt in a prompt-and-response sector of a display of the media presentation device wherein a user may enter a response to the prompt; and display the digital media clip in a video presentation sector of the display with an actuator via which the user may cause the display device to play the digital media clip and output audio comprising the sentence.

25. The method of claim 21 further comprising causing a media presentation device to, when outputting the lesson:

output the prompt;

receive a spoken response to the prompt from a user via an audio input device of the media presentation device; and output the digital media clip with an actuator via which the user may cause the media presentation device to play the digital media clip and output audio comprising the sentence.

26. The method of claim 21, wherein one or more of the key words comprise a named entity or event extracted from the sentence.

* * * * *